United States Patent [19]
Drexler et al.

[11] 3,920,999
[45] Nov. 18, 1975

[54] X-RAY SOURCE

[75] Inventors: Günter Drexler, Oberschleissheim; Werner Panzer, Munich; Hans Schöfer, Munich, all of Germany

[73] Assignee: Gesellschaft füer Strahlen- und Umweltforachung mbH Müenchen, Neuherberg, Germany

[22] Filed: Nov. 27, 1973

[21] Appl. No.: 419,293

[30] Foreign Application Priority Data
Dec. 12, 1972 Germany............................ 2259382

[52] U.S. Cl. .................................. 250/493; 250/510
[51] Int. Cl. ............................................. G01n 23/22
[58] Field of Search ............ 250/460, 505, 508, 510, 250/493, 503; 313/56, 59

[56] References Cited
UNITED STATES PATENTS

| | | | |
|---|---|---|---|
| 2,097,002 | 10/1937 | Thaller.................................. | 313/56 |
| 2,797,333 | 6/1957 | Reiffel ................................ | 250/493 |
| 3,175,084 | 3/1965 | Hersh.................................. | 250/460 |
| 3,383,510 | 5/1968 | Sellers................................. | 250/510 |
| 3,525,863 | 8/1970 | Constantine et al................ | 250/273 |
| 3,567,928 | 3/1971 | Davies et al. ...................... | 250/493 |

Primary Examiner—James W. Lawrence
Assistant Examiner—B. C. Anderson
Attorney, Agent, or Firm—Spencer & Kaye

[57] ABSTRACT

An X-ray source for generating monoenergetic X-rays of high intensity has a cylindrical source of primary radiation; a scattering body disposed in the axis of the source of primary radiation for emitting an X-ray fluorescence radiation when excited by the source of primary radiation; a primary filter separating the source of primary radiation from the scattering body; a collimator adjoining the scattering body and having an axially extending throughgoing bore; a diaphragm adjoining the collimator at that open end of the collimator bore which is remote from the scattering body, the diaphragm is provided with an aperture which is in registry with the collimator bore; and a secondary filter which covers the aperture of the diaphragm.

17 Claims, 1 Drawing Figure

U.S. Patent  Nov. 18, 1975  3,920,999
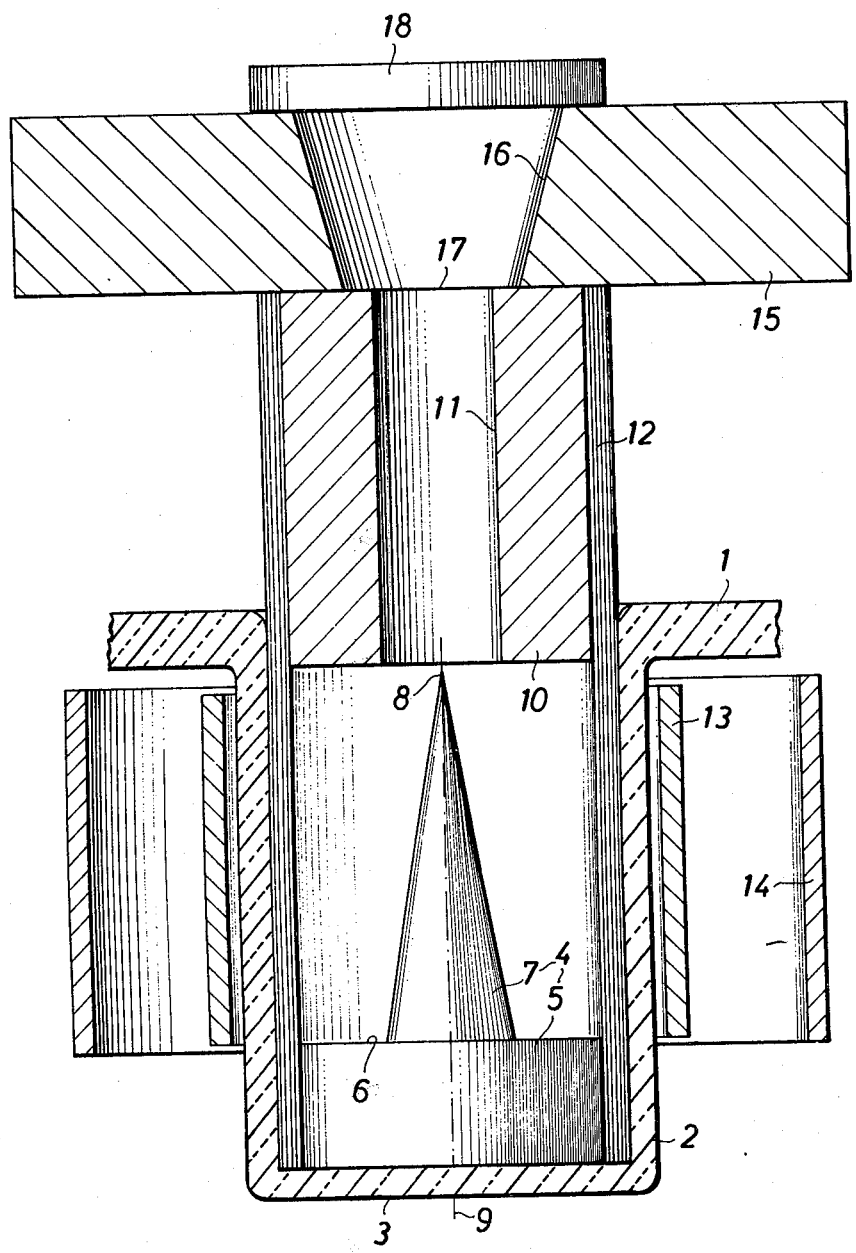

X-RAY SOURCE

BACKGROUND OF THE INVENTION

The present invention relates to an X-ray source for the generation of monoenergetic X-rays of high intensity with a cylindrical source of primary radiation and an outlet for the X-rays.

In present X-ray and gamma dosimetry docimeters are used whose operating principle is based on different physical phenomena. The reading of these dosimeters is a function of the quantum energy of the incident radiation. For lack of suitable monochromatic radiation and especially for lack of a powerful monochromatic point-like X-ray source it is not possible presently to intercompare and calibrate various systems.

Also the use of broad-band slowing-down spectra of the type generated by the usual X-ray tubes has largely negative consequences in X-ray diagnostics because, among other factors, the soft fraction of the incident spectrum is almost completely absorbed by the tissue to be irradiated. This only increases the radiation burden without providing any information later on. For the high-energy side of the spectrum the detection probability of the dector is no longer optimal. Only in case of monochromatic X-radiation can such parameters as radiation quality, range of detector sensitivity and body examined be optimized. Another disadvantage of the diagnostic use of slowing-down spectra is the fact that low-energy scattered radiation can be separated only at great expense from the attenuated primary radiation generating the image.

This breakdown into radiation carrying the information and the diffuse background of secondary radiation, which enhances contrast, can be achieved only with monochromatic radiation, because monochromatic quantum radiation would offer X-ray diagnostics the advantages of a lower exposure dose and at the same time improve contrast.

Also for basic biological studies (sensitivity functions of tissue in the energy range between some 10 keV and 100 keV) a powerful X-ray fluorescence equipment is very important. Such studies could so far been conducted only under unsatisfactory conditions with the radioactive materials americium 241 (60 keV) and cerium 129 (80 keV) which are the only natural emitters in the above-noted energy range that can be used.

The X-ray fluorescence facilities designed so far do cover the quoted range closely enough, but the beam intensity is not sufficient for many uses. In addition, the source is too large to be used for imaging purposes.

A source of primary radiation which can be used for these purposes is known as the high power X-ray tube (after Professor Dr. B. Rajewsky). It has large-area cylindrical anodes in the interior of which the useful field is generated. The anodes are called can anodes and have a vertical can-shaped irradiation space with a volume of approximately 4000 cm$^3$. The irridiation space proper is closed with a cover impervious to radiation.

SUMMARY OF THE INVENTION

It is an object of the present invention to generate monoenergetic X-radiation of high intensity in the range between 10 keV and 100 keV with the energy range covered as closely as possible and the source of X-ray fluorescence radiation having the smallest possible dimensions. In addition, the fluorescence system should have a concentric design and an almost homogeneous, very dense radiation field should be generated in its interior. At the same time, the system must easily be changed from one type of radiation to the other without requiring an otherwise necessary realignment of the scattering body and the source of primary radiation. Moreover, an optimum, i.e. Gaussian, emission profile is to be achieved for the imaging characeristics of the fluorescent radiation by proper choice of the geometry of the scattering body.

In the present invention the solution of this problem is characterized in that a scattering body generating the X-ray fluorescence radiation is disposed in the axis of the source of primary radiation, separated by a primary filter; the scattering body is adjoined in the direction of the outlet by a collimator with an internal bore; the aperture of the internal bore of the collimator facing away from the scattering body is adjoined by a diaphragm, the aperture of which is covered by a chromatizing secondary filter. The scattering body may be a cone whose tip points towards the internal bore of the collimator.

In embodiments of the present invention the collimator may also be made of an active material, i.e., a material generating X-ray fluorescence radiation. The source of primary radiation may be either a can anode or may be constituted by a radioactive preparation enclosing the scattering body.

According to a further development of the present invention the collimator and the scattering body are made of the same material.

According to still another development of the present invention it is possible also to generate spectra with several selectable discrete lines. For this purpose, the scattering body is made of mixtures of several elements so that several fluorescence lines are obtained in accordance with the number of fractions in the mixture. These then constitute the desired spectrum. Such mixed radiation sources can also be used, e.g., in imaging in X-ray diagnostics, to attain the most favorable contrast simultaneously for different types of tissue (e.g., air - tissue contrast, bone - tissue contrast).

BRIEF DESCRIPTION OF THE DRAWING

The sole FIGURE illustrates a preferred embodiment of the invention in axial longitudinal section.

DESCRIPTION OF THE PREFERRED EMBODIMENT

In the FIGURE, there is shown part of a vacumizable X-ray tube 1 made of glass and having a cup-shaped extension 2 with a bottom 3. The scattering body 4 (the X-ray fluorescence radiation source) is disposed on the bottom 3. The scattering body 4 consists of a disk 5 with a cone 7 attached to its upper surface 6 with a cone angle of 20°.

The tip 8 of the cone 7 is followed in the axial direction 9 by the collimator 10 having an internal bore 11. The collimator 10 proper has the shape of a cylinder. The collimator 10 and the scattering body 4 are surrounded by a primary filter 12 which also is shaped like a cylinder. The primary filter 12 is inserted into the cup-shaped extension 2.

The cup-shaped extension 2 is surrounded by an annular can anode 13 which is for generating the primary radiation, is excited by a cathode 14 surrounding it with an annular clearance. The primary radiation of the can anode 13 is filtered by the primary filter 12 and the radiation passing through the filter 12 generates X-ray fluorescence radiation in the scattering body 4. The distance between the can anode 13 and the scattering body 4 is preferably maintained very small to achieve a correspondingly high density of primary radiation as compared with conventional X-ray fluorescence sources. The increase in output for the generation of X-ray, fluorescence radiation has a factor of 50 in case of a reduction of the source diameter to about 2 mm.

The collimator 10, which itself may be made of a material actively contributing to the X-ray fluorescence radiation, is followed by a diaphragm 15 having a conical aperture 16. The aperture 16 is positioned over the open end 17 of the internal bore 11 in the collimator 10 and is closed on the diaphragm side facing away from the end 17 by the secondary filter 18 which allows only radiation of the desired type to leave the radiation source. The aperture 16 with the secondary filter 18 may be regarded as the outlet on an intense monochromatic X-radiation.

The scattering body-and-diaphragm system 4, 10, 12, 15, 18 can be introduced into the cup-shaped extension 2 of the source of primary radiation like an eyepiece into the microscope. In order to cover the desired range of 10–100 keV relatively closely, there must be approximately 20 such systems each of which can then be exchanged in the same source of primary radiation. The ratio between output and source diameter must be adapted to the respective use. For this reason the collimator 10 and the scattering body 4 are mostly made of the same material. Also, the scattering body 4 or the collimator 10, may be made of a mixture or an alloy of various materials.

In one specific embodiment of the scattering body-and-diaphragm system to the present invention, for the can anode 13 a diameter of 7.4 mm is chosen. The diameter of the source (scattering body 4) is two millimeters on the upper side 6 of the disk 5. The material of the scattering body is the same as that of the collimator and may be tin, cerium or lead. The primary filter 12 consists of aluminum ($0.27$ g/cm$^2$) and the secondary filter 18 is made of silver ($0.05$ g/cm$^2$), barium or gold. The whole system may be surrounded by a radiation protection shield of lead (not shown). The diaphragm 15 and the secondary filter 18, similarly to the primary filter 12, may be mounted in the X-ray tube 1 proper.

The output of the system in conjunction with a 2 kW can anode 13 at a distance of 50 cm from the scattering body 4 is 100 mR/min. In case of a concentrically attached gamma source of 1 kCi at the same distance from the scattering body 4, the output is 10 mR/min.

What we claim is:

1. An X-ray source for generating monoenergetic X-rays of high intensity, including a source of primary radiation having a cylindrical shape and a longitudinal axis, comprising in combination:
   a. a body disposed in said axis for emitting an X-ray fluorescence radiation in response to the excitation by said source of primary radiation;
   b. a primary filter surrounding said scattering body for separating said source of primary radiation from said scattering body;
   c. a collimator adjoining said scattering body in the direction of said axis, said collimator including means defining a throughgoing bore extending along said axis away from said scattering body and having an open end remote from said scattering body;
   d. a diaphragm adjoining said collimator at said open end, said diaphragm including means defining an aperture therein, said aperture being in registry with said open end of the collimator bore; and
   e. a secondary filter covering said aperture of said diaphragm.

2. An X-ray source as defined in claim 1, wherein said scattering body has a cone-shaped portion aligned with said axis, said cone-shaped portion has a tip oriented towards said collimator bore.

3. An X-ray source as defined in claim 1, wherein said collimator is made of an active material for generating X-ray fluorescence radiation.

4. An X-ray source as defined in claim 1, wherein said source of primary radiation is a can anode.

5. An X-ray source as defined in claim 1, wherein said source of primary radiation is an anode made of a radioactive material.

6. An X-ray source as defined in claim 1, wherein said primary filter is made of a radioactive material.

7. An X-ray source as defined in claim 1, wherein said collimator and said scattering body are made of the same material.

8. An X-ray source as defined in claim 1, wherein said scattering body is made of a mixture of different elements.

9. An X-ray source as defined in claim 1, wherein said scattering body is made of an alloy of different elements.

10. An X-ray source as defined in claim 1, wherein said scattering body and said collimator are made of tin, said primary filter is made of aluminum and said secondary filter is made of silver.

11. An X-ray source as defined in claim 1, wherein said scattering body is made of cerium, said primary filter is made of aluminum and said secondary filter is made of barium.

12. An X-ray source as defined in claim 1, wherein said scattering body and said collimator are made of lead, said primary filter is made of aluminum and said secondary filter is made of gold.

13. An X-ray source as defined in claim 1, further including a protective lead shield surrounding said source.

14. An X-ray source as defined in claim 1, wherein said scattering body and said collimator constitute a source of fluorescence radiation.

15. An X-ray source as defined in claim 14, wherein said primary filter has the shape of a hollow cylinder and surrounds said scattering body and said collimator.

16. An X-ray source as defined in claim 1, further including a vacuumizable tube housing said scattering body, said collimator, said diaphragm and said secondary filter.

17. An X-ray source as defined in claim 1, wherein said scattering body has a geometry for generating a Gaussian emission profile optimal for imaging.

* * * * *

UNITED STATES PATENT AND TRADEMARK OFFICE
CERTIFICATE OF CORRECTION

PATENT NO. : 3,920,999
DATED : November 18th, 1975
INVENTOR(S) : Günter Drexler et al It is certified that error appears in the above-identified patent and that said Letters Patent are hereby corrected as shown below:

In the heading of the patent, under [73] Assignee, change the assignee's name to read:  --Gesellschaft für Strahlen- und Umweltforschung mbH München--; under [30] Foreign Application Priority Data, change "Dec. 12" to --Dec. 5--

Column 1, line 8, change "docimeters" to --dosimeters--;
         line 58, change "irridiation" to --irradiation--;

Column 2, line 48, change "vacumizable" to --vacuumizable--;

Column 3, line 18, change "on" to --of--.

Signed and Sealed this twenty-third Day of March 1976

[SEAL]

Attest:

RUTH C. MASON
*Attesting Officer*

C. MARSHALL DANN
*Commissioner of Patents and Trademarks*